US009623641B1

(12) United States Patent
Chapman et al.

(10) Patent No.: US 9,623,641 B1
(45) Date of Patent: Apr. 18, 2017

(54) METHOD AND APPARATUS FOR REINFORCING A BLADDER

(71) Applicant: The Boeing Company, Chicago, IL (US)

(72) Inventors: Michael R. Chapman, Federal Way, WA (US); Khanh M. Pham, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 217 days.

(21) Appl. No.: 14/035,007

(22) Filed: Sep. 24, 2013

(51) Int. Cl.
| B29C 33/50 | (2006.01) |
| B29C 70/44 | (2006.01) |
| B32B 37/00 | (2006.01) |
| B29C 33/40 | (2006.01) |
| B29C 43/36 | (2006.01) |

(52) U.S. Cl.
CPC ........ B32B 37/0023 (2013.01); B29C 33/405 (2013.01); B29C 33/505 (2013.01); B29C 43/3642 (2013.01); B29C 70/446 (2013.01); B29C 2043/3649 (2013.01)

(58) Field of Classification Search
CPC ... B29C 33/405; B29C 33/485; B29C 70/446; B29C 33/3828; B29C 33/505; B29C 33/50; B29C 2043/3649; B29C 2043/3648; B29C 2043/3657
See application file for complete search history.

(56) References Cited

U.S. PATENT DOCUMENTS

| 5,087,187 | A | * | 2/1992 | Simkulak | ................ B29C 43/32 264/258 |
| 5,368,807 | A | * | 11/1994 | Lindsay | ............. B29D 99/0014 264/258 |
| 7,293,737 | B2 | | 11/2007 | Engwall et al. | |
| 7,879,276 | B2 | | 2/2011 | Guzman et al. | |
| 8,262,969 | B2 | | 9/2012 | Wade et al. | |
| 8,419,402 | B2 | | 4/2013 | Guzman et al. | |
| 2002/0135090 | A1 | * | 9/2002 | Koren | ................... B29C 33/505 264/101 |
| 2010/0009124 | A1 | | 1/2010 | Robins et al. | |
| 2010/0044912 | A1 | * | 2/2010 | Zahlen | .................. B29C 33/505 264/219 |
| 2010/0186899 | A1 | * | 7/2010 | Jackson | .................. B29C 33/10 156/382 |

(Continued)

FOREIGN PATENT DOCUMENTS

WO    WO2011033741 A1    3/2011

OTHER PUBLICATIONS

Peters, S.T., Handbook of Composites, Second Edition, 1998, pp. 352-377.*

*Primary Examiner* — William Bell
(74) *Attorney, Agent, or Firm* — Yee & Associates, P.C.

(57) ABSTRACT

A method and apparatus for reinforcing an end portion of a deformable tool configured for use in forming a composite object. An insert may be placed within a hollow portion of the end portion of the deformable tool in which the insert substantially conforms to a cross-sectional shape and a size of the hollow portion of the end portion of the deformable tool. A side of the end portion of the deformable tool may be reinforced by the insert located within the hollow portion of the end portion of the deformable tool during a curing process used to form the composite object.

22 Claims, 11 Drawing Sheets

(56) References Cited

U.S. PATENT DOCUMENTS

| | | |
|---|---|---|
| 2011/0272086 A1* | 11/2011 | Dittman ............... B29C 33/485 156/155 |
| 2011/0277918 A1 | 11/2011 | Lee et al. |
| 2011/0308711 A1* | 12/2011 | Coleman et al. ............. 156/189 |
| 2012/0235336 A1* | 9/2012 | Sana et al. ..................... 269/47 |
| 2013/0139945 A1* | 6/2013 | Buerkner et al. ............... 156/60 |

* cited by examiner

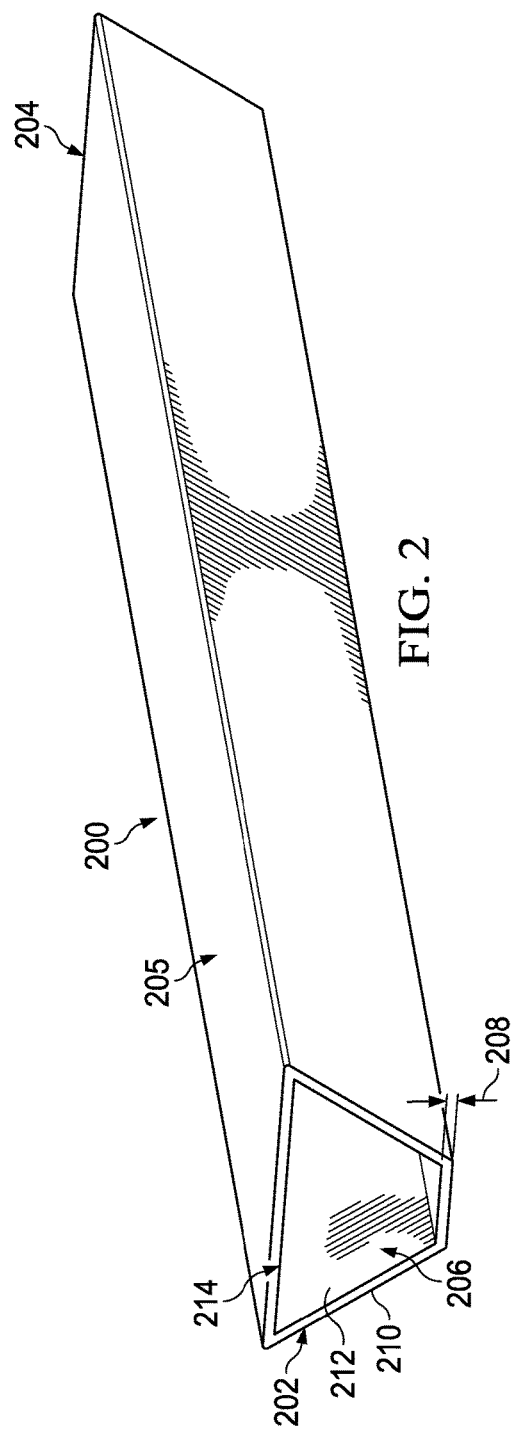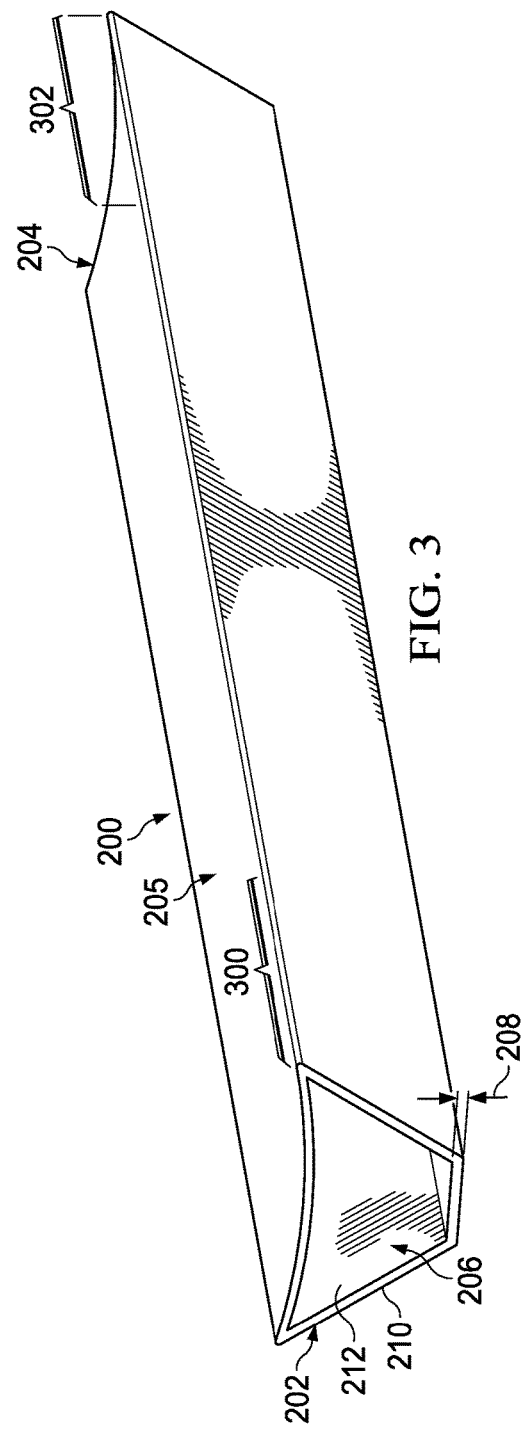

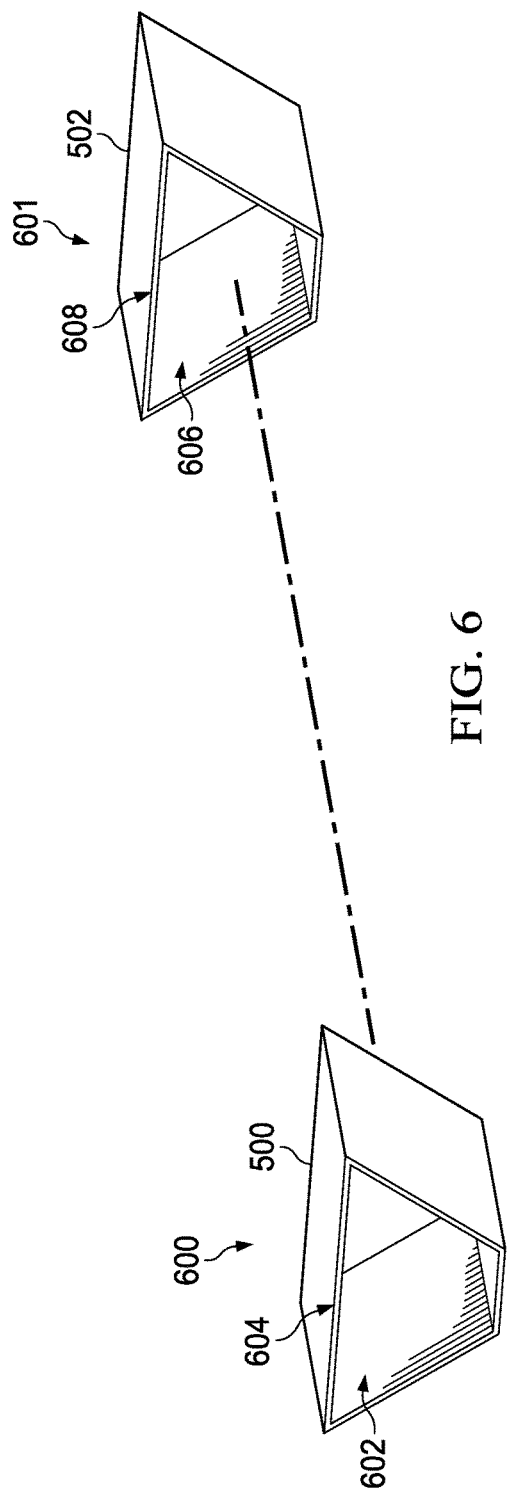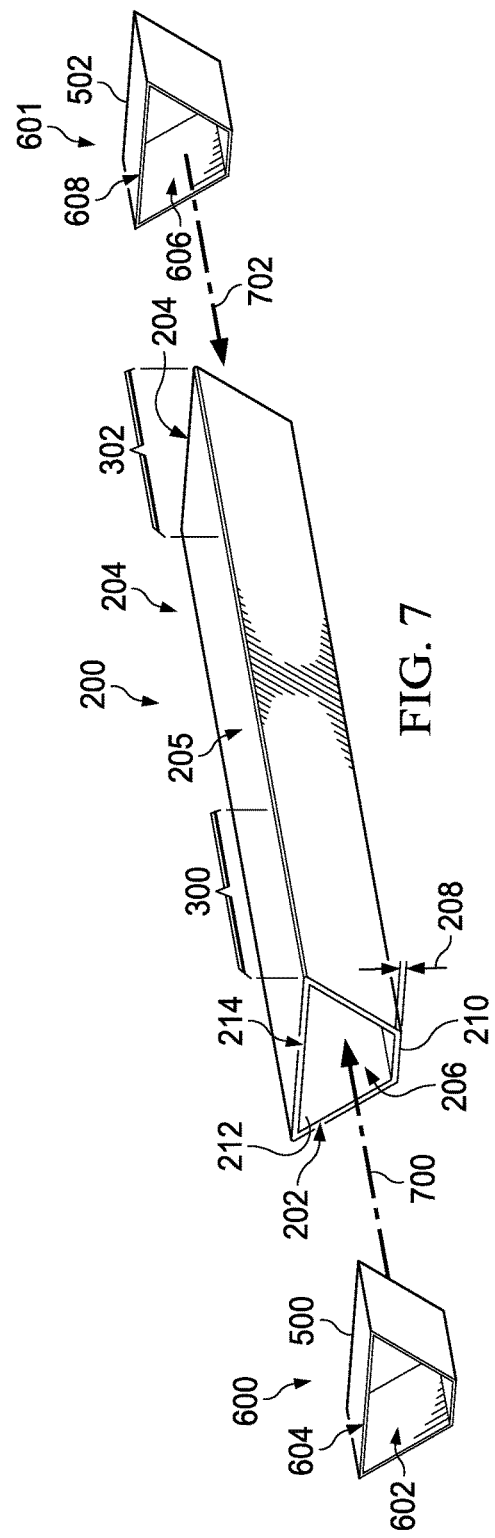

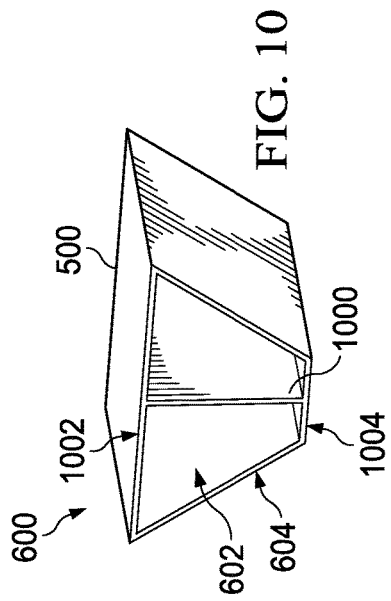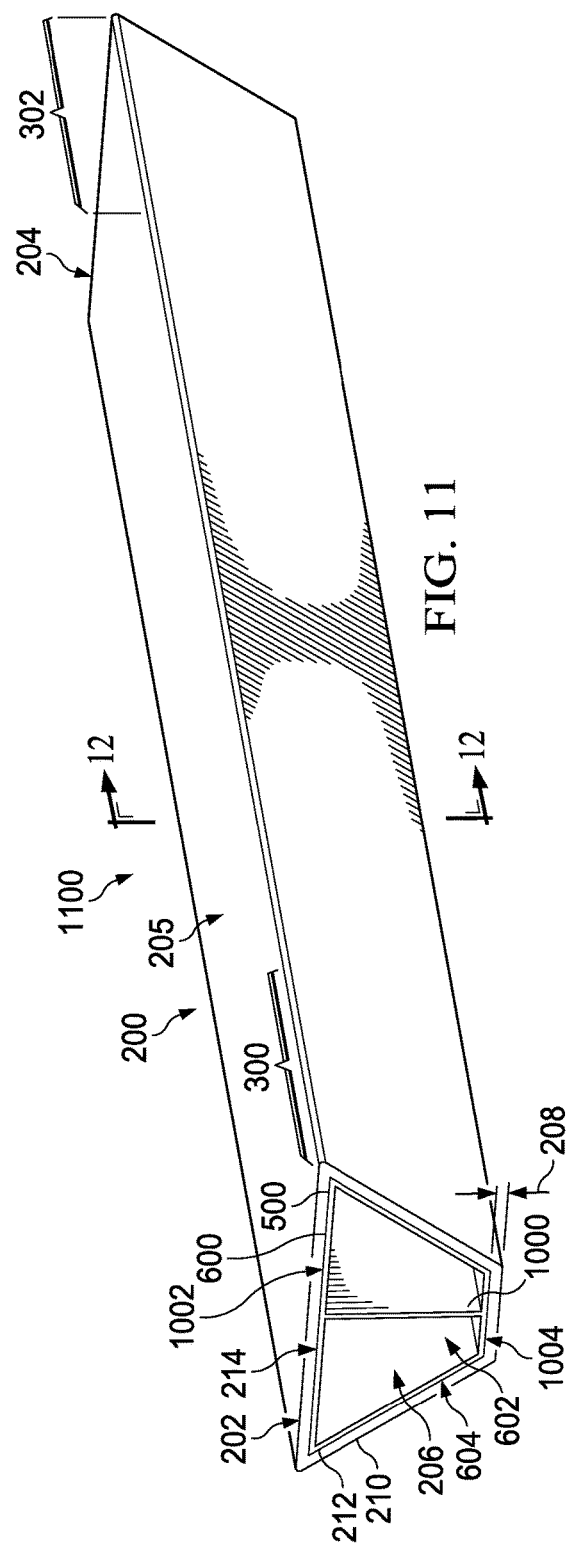

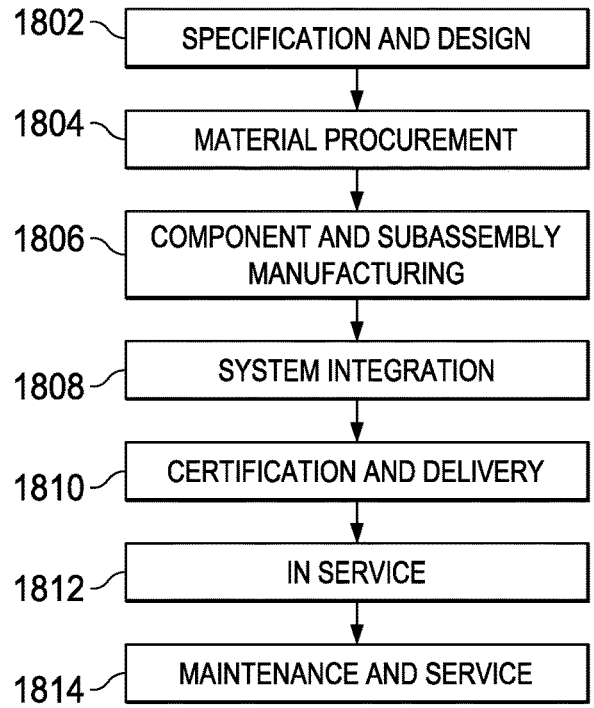
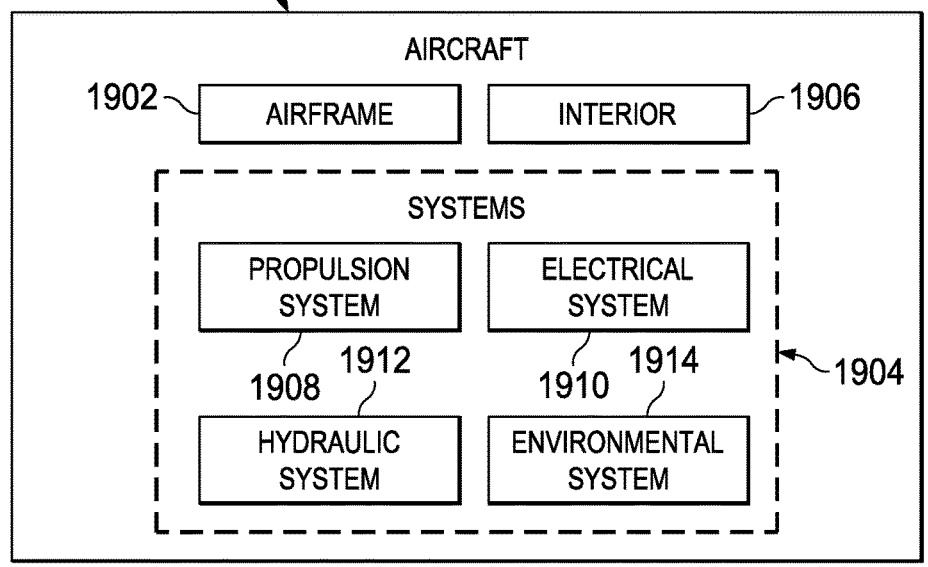

METHOD AND APPARATUS FOR REINFORCING A BLADDER

BACKGROUND INFORMATION

1. Field

The present disclosure relates generally to the manufacturing of composite objects and, in particular, to bladders used to form composite objects. Still more particularly, the present disclosure relates to a method and apparatus for reinforcing a bladder, which may be used for forming composite objects, with an insert.

2. Background

Stringers may be used to stiffen aircraft structures, such as, for example, without limitation, the fuselage of an aircraft. As used herein, a "stringer" may be a strip of material or structure to which a panel may be attached. In an aircraft, a stringer may be attached to a fuselage skin to transfer aerodynamic loads away from the fuselage skin. A stringer may also be referred to as a stiffener in some cases. A composite stringer is a stringer comprised of one or more composite materials.

Typically, a bladder may be used to form a composite stringer for an aircraft. The bladder used to form a composite stringer may be comprised of, for example, without limitation, rubber and/or other types of materials. In one illustrative example, one or more layers of composite material may be laid up over the bladder such that the layers of composite material conform to the outer shape of the bladder. This stackup of the layers of composite material may be referred to as a stringer layup. The stringer layup, supported by the bladder, may then be cured to form the composite stringer.

A hat stringer, also referred to as a hat stiffener, may have a cross-sectional shape that is similar to a hat. A hat stringer may have two webs, which are connected by a cap, that extend from a base. The base may be part of the hat stringer or may be the skin or panel to which the hat stringer may be attached.

The bladder that is used to form a hat stringer may have a cross-sectional shape that is a trapezoidal shape. In one example, a composite panel may be positioned at the base of the trapezoidal shape with the stringer layup positioned over the other three sides of the trapezoidal shape. The composite panel may extend substantially the entire length of the bladder. However, the composite panel may be longer than the stringer layup and may extend past at least one end of the stringer layup.

The stringer layup and the composite panel may be cured together with the bladder to both form the hat stringer and attach the hat stringer to the composite panel. The bladder may then be removed from the hat stringer-composite panel assembly. Because the composite panel is longer than the stringer layup, at least one end portion of the composite panel may not have any contact with the hat stringer. This end portion may be used to attach the composite panel to a different composite panel to form a splice joint.

Forming this splice joint may require that the end portion of the composite panel be substantially planar, or flat, within selected tolerances. However, in some cases, the end portion of the composite panel may be out-of tolerance. For example, without limitation, the bladder used to form the hat stringer may be a reusable bladder that has been used to form multiple hat stringers.

When the bladder is exposed to curing temperatures and/or pressures for an extended period of time, the bladder may change shape. For example, without limitation, the bladder may depress slightly. In other words, the bladder may begin to cave inwards. Once a bladder has depressed more than desired, an out-of-tolerance condition may be created after curing for the end portion of the composite panel where the splice joint is to be formed. Consequently, this end portion of the composite panel may need to be reworked in order to meet selected tolerances. This rework may be performed using a shim material, sanding, and/or some other type of component or operation to bring the composite panel within tolerances. This type of rework may be more time-consuming and labor-intensive than desired. Therefore, it would be desirable to have a method and apparatus that take into account at least some of the issues discussed above, as well as other possible issues.

SUMMARY

In one illustrative embodiment, an apparatus may comprise a deformable tool and an insert. The deformable tool may be configured for use in forming a composite object by a curing process in which the deformable tool has a hollow portion with a shape and a size. The insert may be configured for placement within the hollow portion of an end portion of the deformable tool to reinforce a side of the end portion of the deformable tool during the curing process in which the insert substantially conforms to a cross-sectional shape and a size of the hollow portion.

In another illustrative embodiment, a bladder assembly may comprise a bladder and a composite insert. The bladder may comprise an outer surface and an inner surface. A composite panel and a number of composite layers may be configured to be laid up over the outer surface of the bladder. The inner surface of the bladder may form a hollow portion of the bladder. The composite insert may be placed within the hollow portion of an end portion of the bladder to reinforce a side of the end portion of the bladder in contact with an end portion of the composite panel when the composite insert and the bladder with the composite panel and the number of composite layers around the outer surface of the bladder are cured in a curing process to form a composite object. The composite insert may substantially conform to a cross-sectional shape and a size of the hollow portion of the end portion of the bladder.

In yet another illustrative embodiment, a method for reinforcing an end portion of a deformable tool configured for use in forming a composite object may be provided. An insert may be placed within a hollow portion of the end portion of the deformable tool in which the insert substantially conforms to a cross-sectional shape and a size of the hollow portion of the end portion of the deformable tool. A side of the end portion of the deformable tool may be reinforced by the insert located within the hollow portion of the end portion of the deformable tool during a curing process used to form the composite object.

In still yet another illustrative embodiment, a method for reinforcing a bladder may be provided. A composite insert may be formed using a number of composite materials and a mandrel such that the composite insert is configured to fit within a hollow portion of an end portion of the bladder. The composite insert may be placed within the hollow portion of the end portion of the bladder such that the composite insert substantially conforms to a size and a cross-sectional shape of the hollow portion of the end portion of the bladder. A composite panel and a number of composite layers may be laid up over an outer surface of the bladder. A curing process may be performed to cure the composite panel and the number of composite layers laid up over the outer surface of the bladder with the composite insert located within the hollow portion of the end portion of the bladder using at least one of an autoclave or an oven to form a composite object. A side of the end portion of the bladder on contact with an end portion of the composite panel may be reinforced during the curing process by the composite insert. The composite insert may prevent the side of the end portion of the bladder from collapsing inwards during the curing process.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is an illustration of a bladder in accordance with an illustrative embodiment;

FIG. 3 is an illustration of a side of a bladder being depressed in accordance with an illustrative embodiment;

FIG. 6 is an illustration of a composite insert in accordance with an illustrative embodiment;

FIG. 7 is an illustration of a composite insert being placed within a bladder in accordance with an illustrative embodiment;

FIG. 10 is an illustration of a different configuration for a composite insert in accordance with an illustrative embodiment;

FIG. 11 is an illustration of a composite insert with a structural element placed within a bladder in accordance with an illustrative embodiment;

FIG. 18 is an illustration of an aircraft manufacturing and service method in the form of a flowchart in accordance with an illustrative embodiment; and FIG. 19 is an illustration of an aircraft in the form of a block diagram in accordance with an illustrative embodiment.

DETAILED DESCRIPTION

The illustrative embodiments recognize and take into account different considerations. For example, the illustrative embodiments recognize and take into account that it may be desirable to have a method and apparatus for reinforcing existing bladders to prevent the end portions of these bladders from depressing more than desired during curing. Thus, the illustrative embodiments provide an insert that may be used to reinforce an end portion of a bladder.

Figure 1:
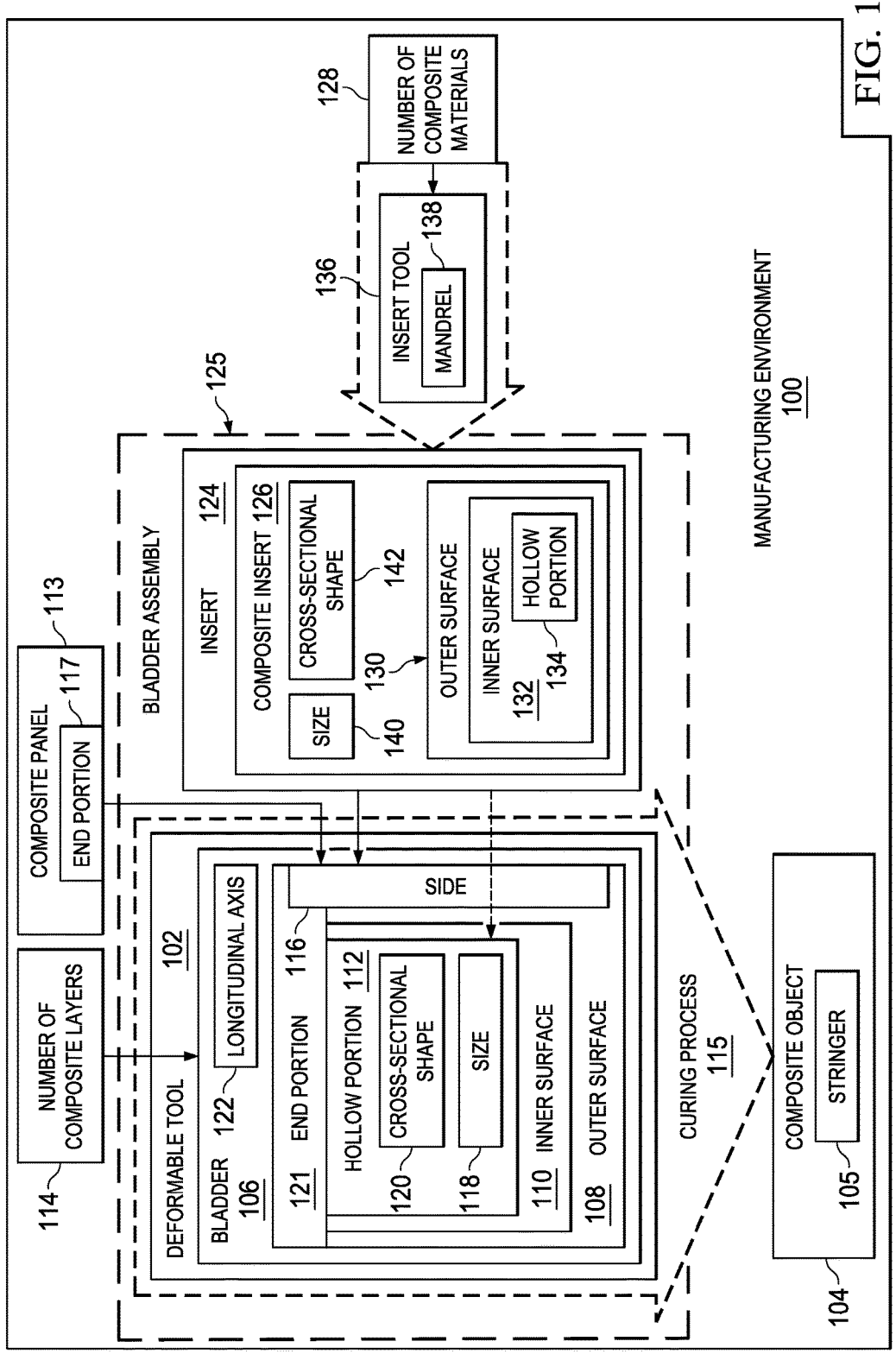
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. Manufacturing environment 100 may be an example of an environment in which deformable tool 102 may be used to form composite object 104.

Composite object 104 may take a number of different forms. In one illustrative example, composite object 104 may take the form of stringer 105. Stringer 105 may be, for example, without limitation, a hat stringer. Of course, in other illustrative examples, stringer 105 may take the form of some other type of stringer having some other type of shape. Further, composite object 104 may take the form of some other type of object other than stringer 105, depending on the implementation.

As depicted, deformable tool 102 may take the form of bladder 106. Bladder 106 may be deformable in that bladder 106 may be expandable. Bladder 106 may be comprised of a material such as, for example, without limitation, rubber. Of course, depending on the implementation, bladder 106 may be comprised of any number of materials that may include rubber, a synthetic elastomer, a polymer, and/or one or more other types of materials. When stringer 105 to be formed is a hat stringer, bladder 106 may have trapezoidal shape.

Bladder 106 may have outer surface 108 and inner surface 110. Inner surface 110 may define hollow portion 112 of bladder 106. Hollow portion 112 may reduce weight of bladder 106. Hollow portion 112 may have size 118 and cross-sectional shape 120. Cross-sectional shape 120 may be the shape of a cross-section of hollow portion 112 taken substantially perpendicular to longitudinal axis 122 through bladder 106. Longitudinal axis 122 may be an axis that runs along the length of bladder 106. Cross-sectional shape 120 may be substantially constant along longitudinal axis 122 in this illustrative example. However, in other cases, cross-sectional shape 120 may vary within selected tolerances along longitudinal axis 122.

Composite panel 113 may be positioned over outer surface 108 of bladder 106 at side 116 of bladder 106. When bladder 106 has a trapezoidal shape, side 116 of bladder 106 may be the base of this trapezoidal shape. Number of composite layers 114 may be laid up over the other sides of outer surface 108 of bladder 106. Number of composite layers 114 may be referred to as a stringer layup when composite object 104 takes the form of stringer 105.

As used herein, a "number of" items may be one or more items. In this manner, number of composite layers 114 may include one or more composite layers. In some cases, a composite layer in number of composite layers 114 may be referred to as a composite ply.

Number of composite layers 114 and composite panel 113, supported by bladder 106, may then be cured using curing process 115 to form composite object 104. In particular, number of composite layers 114 may form stringer 105 attached to composite panel 113. Curing process 115 may be performed using at least one of an autoclave, an oven, a temperature and pressure controlled chamber, or some other type of curing device.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

During curing process 115, bladder 106 may be configured to expand in response to increased pressure within hollow portion 112 of bladder 106. This expansion of bladder 106 during curing process 115 may form stringer 105 such that bladder 106 may be removed after curing process 115.

In this illustrative example, composite panel 113 may be longer than number of composite layers 114 with respect to longitudinal axis 122 through bladder 106. In one illustrative example, composite panel 113 may extend the entire length of bladder 106, while number of composite layers 114 may not. Consequently, end portion 117 of composite panel 113 may not have contact with stringer 105 after curing process 115.

End portion 117 of composite panel 113 may be used to form a splice joint with another composite panel in some cases. End portion 117 may need to be substantially planar within selected tolerances. However, during curing process 115, expansion of bladder 106 may cause end portion 117 of composite panel 113 to be out-of-tolerance if end portion 121 of bladder 106 is depressed more than desired. Consequently, side 116 of end portion 121 of bladder 106 that will contact end portion 117 of composite panel 113 may need to be reinforced prior to curing process 115.

Reinforcing side 116 of end portion 121 of bladder 106 may prevent side 116 of end portion 121 of bladder 106 from depressing more than desired with repeated use of bladder 106. In other words, side 116 of end portion 121 of bladder 106 may need to be reinforced such that side 116 of end portion 121 does not collapse inwards.

Insert 124 may be placed within hollow portion 112 of bladder 106 at end portion 121 of bladder 106 along longitudinal axis 122 to reinforce side 116 of end portion 121 of bladder 106. When placed within hollow portion 112 of bladder 106, insert 124 may substantially conform to size 118 and cross-sectional shape 120 of end portion 121 of hollow portion 112 of bladder 106. Together, insert 124 and bladder 106 may form bladder assembly 125.

Insert 124 may take the form of composite insert 126 in this illustrative example. Composite insert 126 may be formed using number of composite materials 128. Number of composite materials 128 may include, for example, without limitation, a composite mesh, a composite fabric, a composite sheet, and/or some other type of composite material. In some illustrative examples, composite insert 126 may be referred to as a composite sleeve.

As depicted, composite insert 126 may have outer surface 130, inner surface 132, and hollow portion 134. Hollow portion 134 may be defined by inner surface 132 of composite insert 126. Outer surface 130 of composite insert 126 may be configured to contact inner surface 110 of bladder 106 when composite insert 126 is placed within hollow portion 112 of bladder 106.

Composite insert 126 may be formed in a number of different ways. In one illustrative example, composite insert 126 may be formed by laying number of composite materials 128 over insert tool 136. Insert tool 136 may take the form of, for example, without limitation, mandrel 138. Mandrel 138 with number of composite materials 128 may then be cured to form composite insert 126.

Composite insert 126 may be formed such that composite insert 126 has size 140 and cross-sectional shape 142 configured to substantially conform to size 118 and cross-sectional shape 120, respectively, of hollow portion 112 of bladder 106. By substantially conforming to size 118 and cross-sectional shape 120, composite insert 126 may reinforce side 116 of end portion 121 of bladder 106 and prevent side 116 of end portion 121 of bladder 106 from caving inwards with repeated use of bladder 106.

Composite insert 126 may be configured to maintain stiffness, or rigidity, during curing process 115. In this manner, composite insert 126 may increase the rigidity of side 116 of end portion 121 of bladder 106. Further, thermal expansion of composite insert 126 during curing process 115 may be within selected tolerances. In this manner, any thermal expansion of composite insert 126 during curing process 115 may not result in an out-of-tolerance condition.

The illustration of manufacturing environment 100 and insert 124 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, as described above, cross-sectional shape 142 of composite insert 126 may be similar to cross-sectional shape 120 of hollow portion 112 of bladder 106 such that cross-sectional shape 142 substantially conforms to cross-sectional shape 120. In other words, cross-sectional shape 142 of composite insert 126 may be proportional to cross-sectional shape 120 of hollow portion 112 of bladder 106. However, in other illustrative examples, cross-sectional shape 142 of composite insert 126 may only conform to a portion of cross-sectional shape 120 of hollow portion 112 of bladder 106. For example, without limitation, composite insert 126 may only be configured to contact a portion of inner surface 110 of bladder 106.

Further, although insert 124 is described as taking the form of composite insert 126, insert 124 may be implemented in some other manner using some other number of materials. For example, without limitation, insert 124 may be comprised of any material or combination of materials that have a desired thermal expansion coefficient within selected tolerances.

With reference now to FIG. 2, an illustration of a bladder is depicted in accordance with an illustrative embodiment. Bladder 200 may be an example of one implementation for bladder 106 in FIG. 1. Bladder 200 may have first end 202 and second end 204. Side 205 of bladder 200 may be the side over which a composite panel, such as composite panel 113 in FIG. 1, is placed. Side 205 may be an example of one implementation for side 116 in FIG. 1.

Further, bladder 200 may have hollow portion 206 surrounded by a wall of thickness 208. This wall may be formed by outer surface 210 and inner surface 212. Inner surface 212 may define hollow portion 206 of bladder 200. In this illustrative example, hollow portion 206 may have cross-sectional shape 214.

Hollow portion 206, outer surface 210, and inner surface 212 may be examples of implementations for hollow portion 112, outer surface 108, and inner surface 110, respectively, in FIG. 1. Further, cross-sectional shape 214 of hollow portion 206 of bladder 106 may be an example of one implementation for cross-sectional shape 120 of hollow portion 112 of bladder 106 in FIG. 1.

Turning now to FIG. 3, an illustration of side 205 of bladder 200 from FIG. 2 being depressed is depicted in accordance with an illustrative embodiment. In this illustrative example, side 205 of bladder 200 may be depressed inwards slightly due to extended exposure to curing temperatures and/or pressures.

Bladder 200 may have end portion 300 and end portion 302. End portion 300 of bladder 200 may be an example of one implementation for end portion 121 in FIG. 1. An insert (not shown), such as insert 124 in FIG. 1, may be needed to prevent side 205 of end portion 300 and side 205 of end portion 302 of bladder 200 from depressing in this manner.

Figure 4:
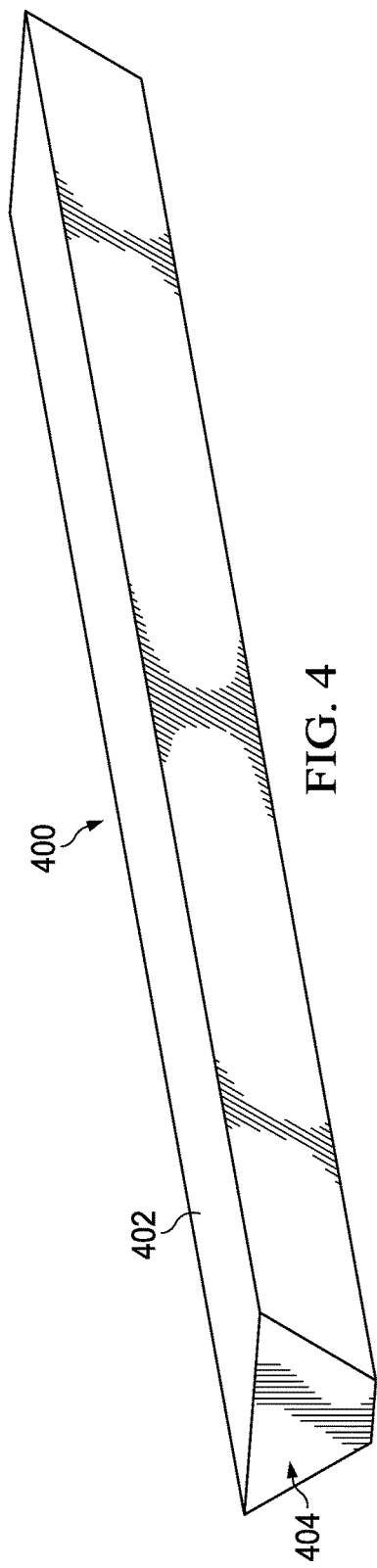
FIG. 4 is an illustration of a mandrel in accordance with an illustrative embodiment.

With reference now to FIG. 4, an illustration of a mandrel is depicted in accordance with an illustrative embodiment. Mandrel 400 may be an example of one implementation for mandrel 138 in FIG. 1. Mandrel 400 may be used to form an insert, such as insert 124 in FIG. 1. Mandrel 400 may have outer surface 402 that forms outer shape 404.

Figure 5:
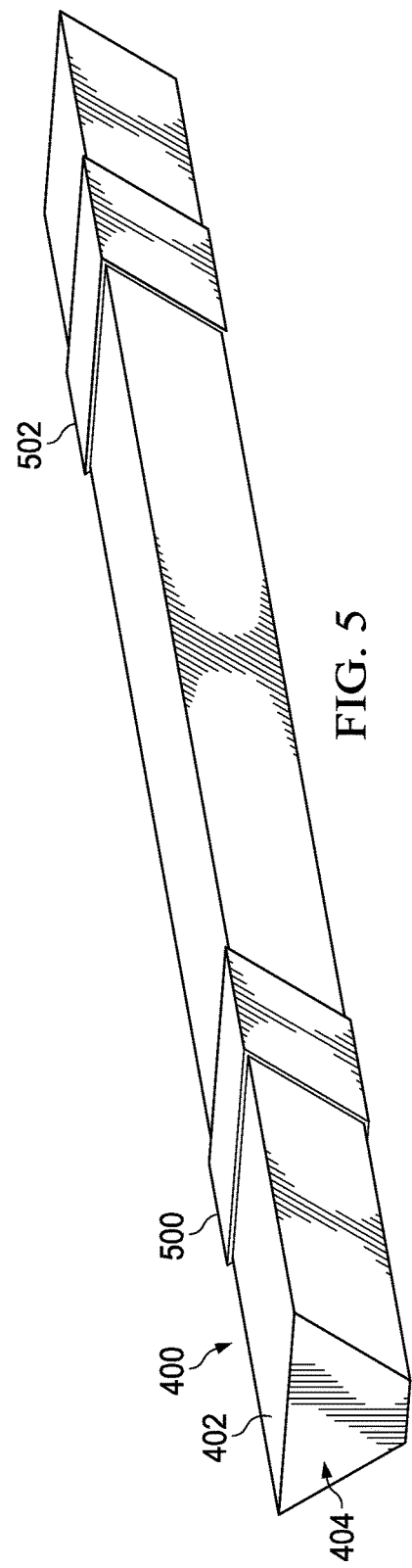
FIG. 5 is an illustration of a composite fabric laid up over a mandrel in accordance with an illustrative embodiment.

With reference now to FIG. 5, an illustration of a composite fabric laid up over mandrel 400 from FIG. 4 is depicted in accordance with an illustrative embodiment. In this illustrative example, composite fabric 500 and composite fabric 502 may be laid up over and around mandrel 400. Composite fabric 500 and composite fabric 502 may each be an example of one implementation for number of composite materials 128 in FIG. 1. Composite fabric 500, supported by mandrel 400, may be cured to form a composite insert (shown as composite insert 600 in FIG. 6 below). Further, composite fabric 502, supported by mandrel 400, may be cured to form a composite insert (shown as composite insert 601 in FIG. 6 below).

With reference now to FIG. 6, an illustration of a composite insert is depicted in accordance with an illustrative embodiment. In this illustrative example, composite insert 600 and composite insert 601 may be the insert formed by curing composite fabric 500 and composite fabric 502, respectively, from FIG. 5, supported by mandrel 400 from FIGS. 4-5. Composite insert 600 and composite insert 601 may each be an example of one implementation for composite insert 126 in FIG. 1. In some cases, composite insert 600 and composite insert 601 may be referred to as composite sleeves.

As depicted, composite insert 600 may have hollow portion 602. Hollow portion 602 of composite insert 600 may be an example of one implementation for hollow portion 134 of composite insert 126 in FIG. 1. Composite insert 600 may have cross-sectional shape 604. Cross-sectional shape 604 of composite insert 600 may be an example of one implementation for cross-sectional shape 142 of composite insert 126 in FIG. 1. Cross-sectional shape 604 may be configured such that composite insert 600 fits within hollow portion 206 of bladder 200 in FIG. 2. In other words, cross-sectional shape 604 of composite insert 600 may allow composite insert 600 to substantially conform to cross-sectional shape 214 of hollow portion 206 of bladder 200 in FIG. 2.

Similarly, composite insert 601 may have hollow portion 606. Hollow portion 606 of composite insert 601 may be an example of one implementation for hollow portion 134 of composite insert 126 in FIG. 1. Composite insert 601 may have cross-sectional shape 608. Cross-sectional shape 608 of composite insert 600 may be an example of one implementation for cross-sectional shape 142 of composite insert 126 in FIG. 1. Cross-sectional shape 608 may be configured such that composite insert 601 fits within hollow portion 206 of bladder 200 in FIG. 2. In other words, cross-sectional shape 608 of composite insert 601 may allow composite insert 601 to substantially conform to cross-sectional shape 214 of hollow portion 206 of bladder 200 in FIG. 2.

With reference now to FIG. 7, an illustration of composite insert 600 from FIG. 6 being placed within bladder 200 from FIG. 2 is depicted in accordance with an illustrative embodiment. In this illustrative example, composite insert 600 may be inserted into hollow portion 206 of bladder 200 in the direction of arrow 700 to reinforce side 205 of end portion 300 of bladder 200. Similarly, composite insert 601 may be inserted into hollow portion 206 of bladder 200 in the direction of arrow 702 to reinforce side 205 of end portion 302 of bladder 200.

Figure 8:
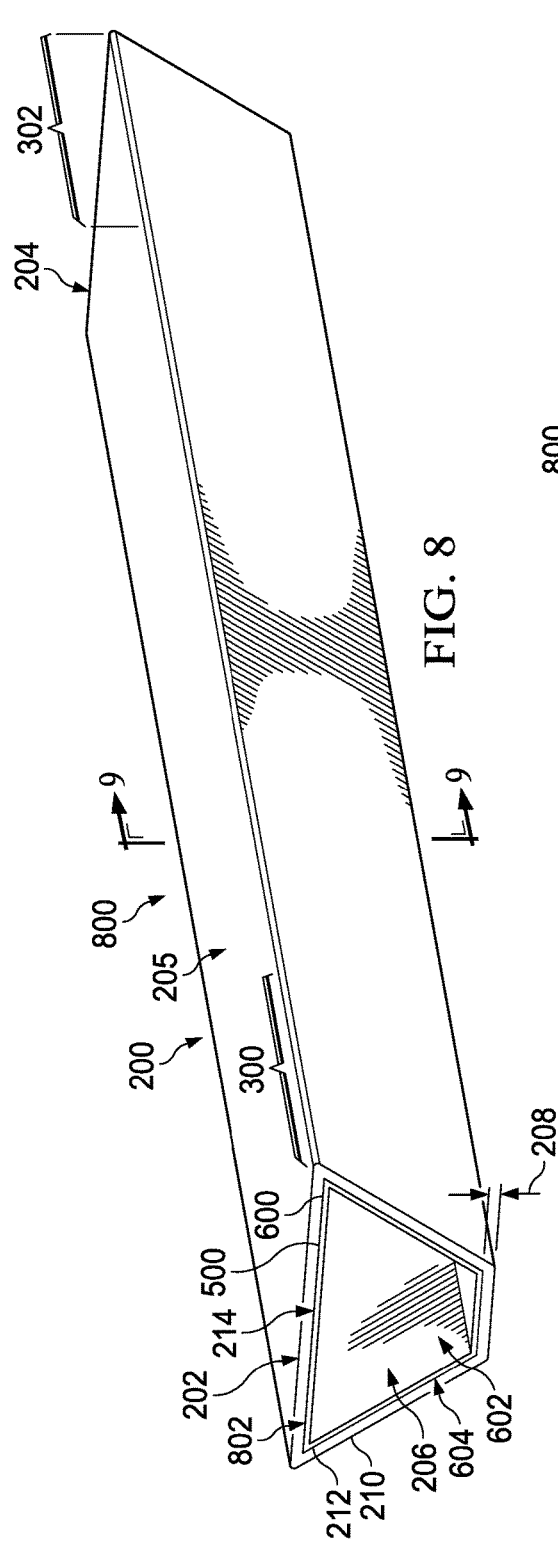
FIG. 8 is an illustration of a bladder assembly in accordance with an illustrative embodiment.

Turning now to FIG. 8, an illustration of a bladder assembly is depicted in accordance with an illustrative embodiment. In this illustrative example, composite insert 600 has been fully placed within bladder 200. Composite insert 601 (not shown in this view) from FIGS. 6 and 7 has also been fully placed within bladder 200

Together, composite insert 600, composite insert 601, and bladder 200 may form bladder assembly 800, which may be an example of one implementation for bladder assembly 125 in FIG. 1. As depicted in this example, composite insert 600 may substantially conform to cross-sectional shape 214 of hollow portion 206 of bladder 200 in a manner that forms interference fit 802 with end portion 300 of bladder 200.

Figure 9:
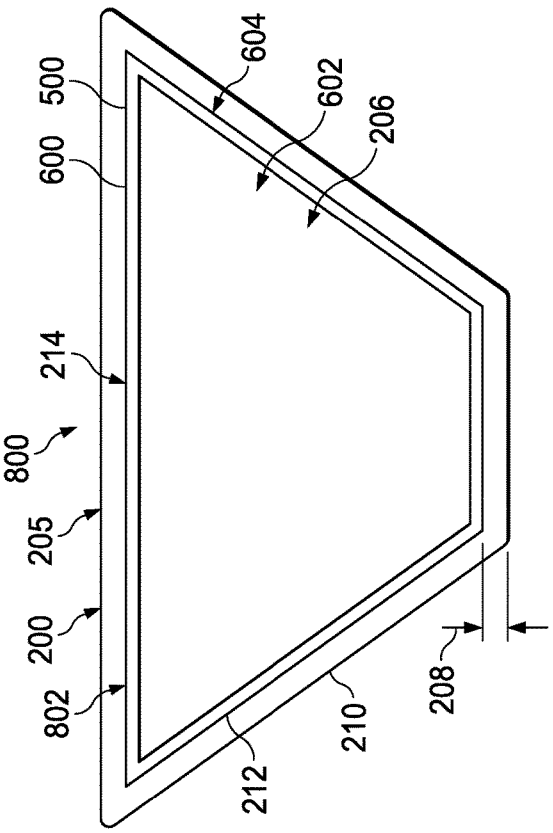
FIG. 9 is an illustration of a cross-sectional view of a bladder assembly in accordance with an illustrative embodiment.

With reference now to FIG. 9, an illustration of a cross-sectional view of bladder assembly 800 from FIG. 8 is depicted in accordance with an illustrative embodiment. In this illustrative example, a cross-sectional view of bladder assembly 800 from FIG. 8 is depicted taken with respect to lines 9-9 in FIG. 8. As depicted, cross-sectional shape 604 of composite insert 600 may substantially conform to cross-sectional shape 214 of hollow portion 206 of bladder 200. Composite insert 600 may not be easily removed from bladder 200 without the application of force above some selected threshold.

With reference now to FIG. 10, an illustration of a different configuration for composite insert 600 from FIG. 6 is depicted in accordance with an illustrative embodiment. In this illustrative example, structural element 1000 may be added to composite insert 600. Structural element 1000 may provide further reinforcement to prevent side 205 of end portion 300 of bladder 200 from depressing as shown in FIG. 3. Structural element 1000 may extend from side 1002 of composite insert 600 to side 1004 of composite insert 600.

With reference now to FIG. 11, an illustration of composite insert 600 with structural element 1000 from FIG. 10 placed within bladder 200 from FIG. 2 is depicted in accordance with an illustrative embodiment. Composite insert 600 having structural element 1000 and bladder 200 may together form bladder assembly 1100, which may be another example of one implementation for bladder assembly 125 in FIG. 1.

Figure 12:
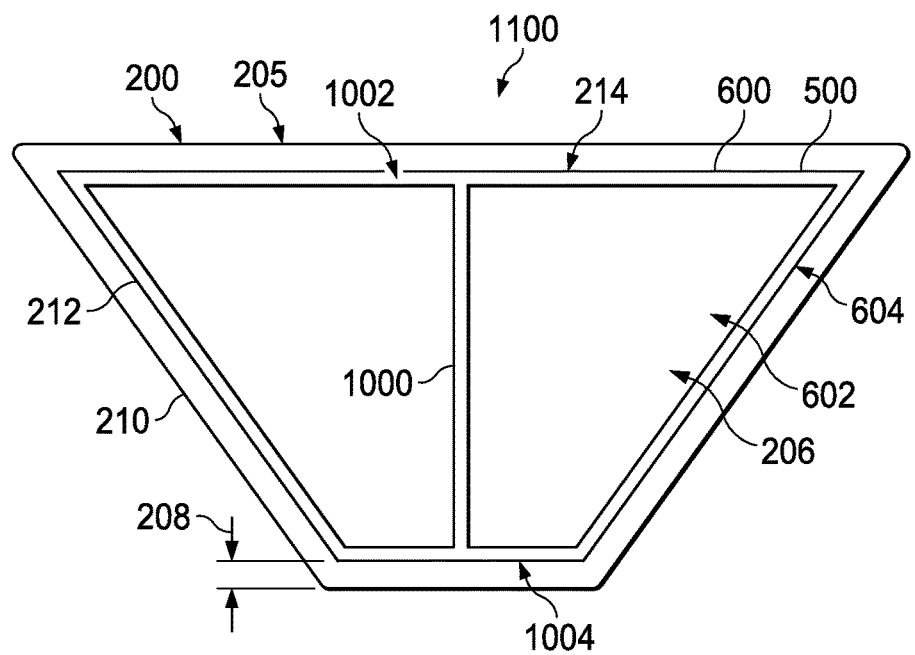
FIG. 12 is an illustration of a cross-sectional view of a bladder assembly in accordance with an illustrative embodiment.

Turing now to FIG. 12, a cross-sectional view of bladder assembly 1100 from FIG. 11 is depicted in accordance with an illustrative embodiment. In this illustrative example, a cross-sectional view of bladder assembly 1100 from FIG. 11 may be depicted taken with respect to lines 12-12 in FIG. 11.

Figure 13:
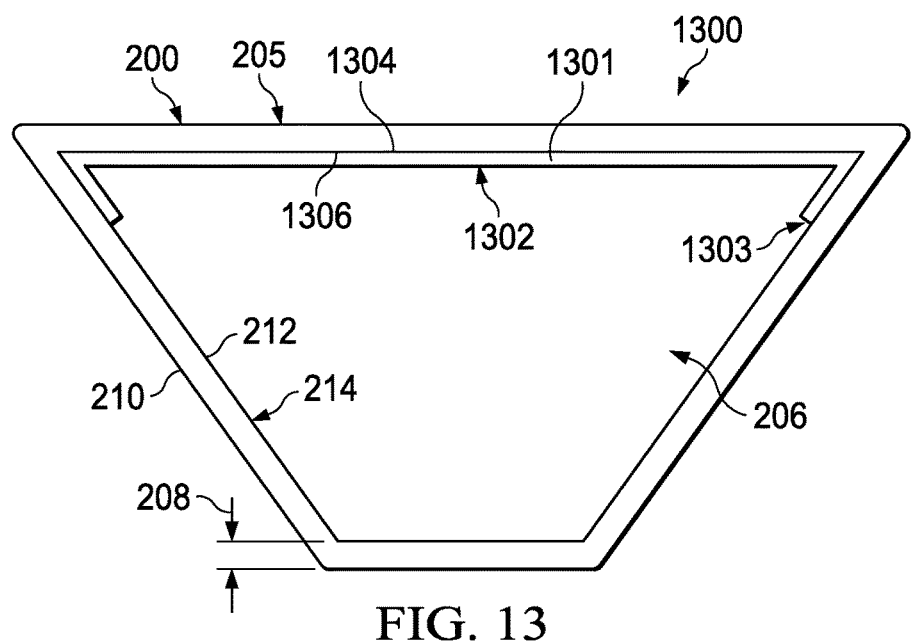
FIG. 13 is an illustration of a cross-sectional view of another type of bladder assembly in accordance with an illustrative embodiment.

With reference now to FIG. 13, an illustration of a cross-sectional view of another type of bladder assembly is depicted in accordance with an illustrative embodiment. In this illustrative example, bladder assembly 1300 may be yet another example of one implementation for bladder assembly 125 in FIG. 1. Bladder assembly 1300 may include composite insert 1301, which may be another example of one implementation for composite insert 126 in FIG. 1.

As depicted, composite insert 1301 may have cross-sectional shape 1302. In this illustrative example, with cross-sectional shape 1302, composite insert 1301 may not come into contact with all of inner surface 212 of bladder 200. However, cross-sectional shape 1302 may be configured such that composite insert 1301 substantially confirms to a portion of cross-sectional shape 214 of hollow portion 206 of bladder 200 in a manner that forms fit 1303.

Cross-sectional shape 1302 of composite insert 1301 and fit 1303 may allow composite insert 1301 to remain in contact with side 205 of end portion 300 of bladder 200 even though composite insert 1301 does not contact all of inner surface 212 of bladder 200. In particular, side 1304 of composite insert 1301 may be used to support inner surface 1306 of end portion 300 of bladder 200. In this manner, side 205 of end portion 300 of bladder 200 may not depress outside of selected tolerances with repeated use.

Figure 14:
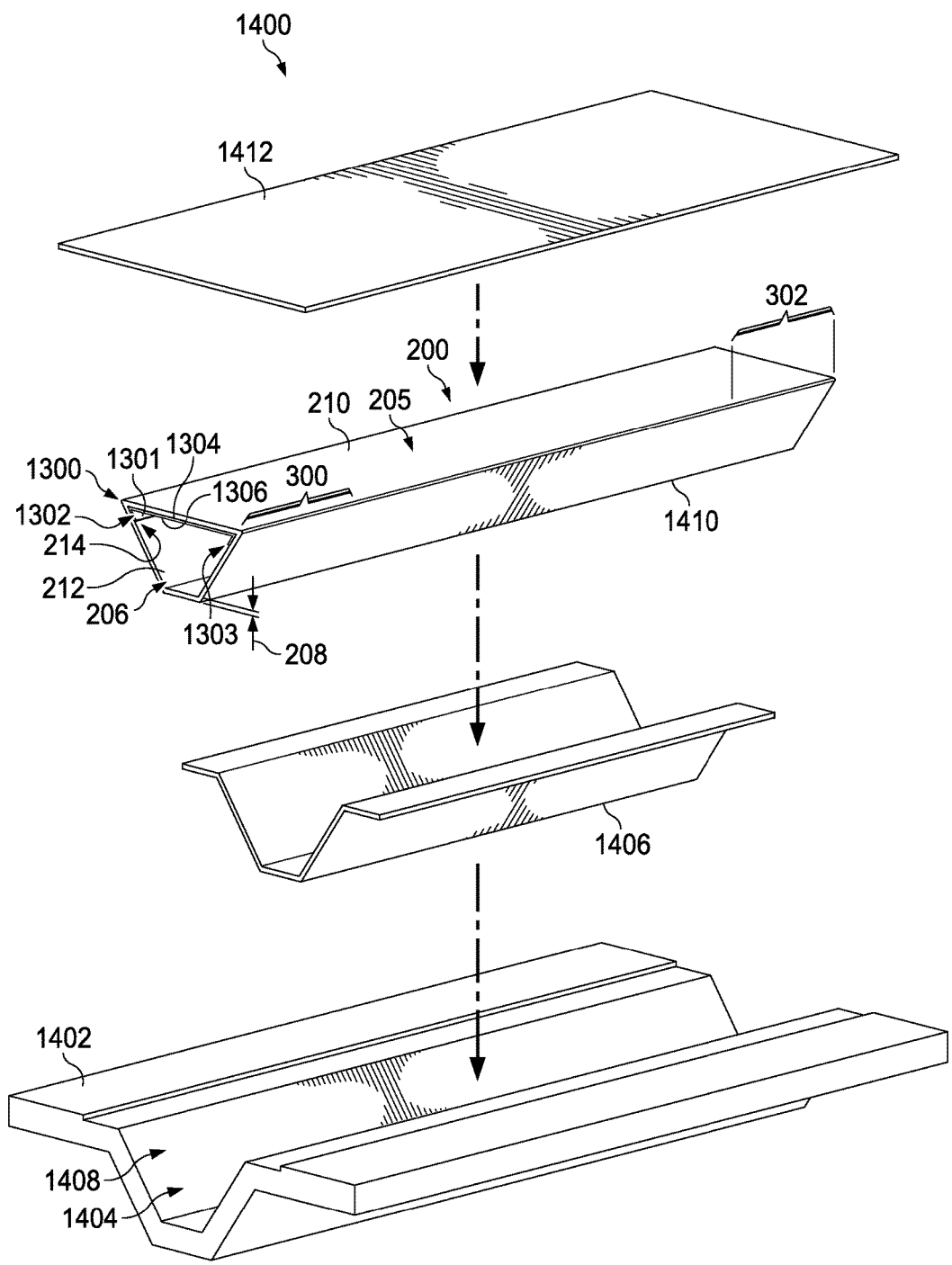
FIG. 14 is an illustration of an exploded view of a tool setup for forming a composite stringer in accordance with an illustrative embodiment.

Turning now to FIG. 14, an illustration of an exploded view of a tool setup for forming a composite stringer is depicted in accordance with an illustrative embodiment. In FIG. 14, tool setup 1400 may be used to form a composite stringer. In this illustrative example, tool setup 1400 may include tool 1402 and bladder assembly 1300 from FIG. 13.

As depicted, tool 1402 may have channel 1404 configured to receive stringer layup 1406 and bladder assembly 1300. Channel 1404 may have shape 1408 similar to the desired shape for the composite stringer to be formed. Stringer layup 1406 may be comprised of one or more layers of composite material for forming a composite stringer. Stringer layup 1406 may be an example of one implementation for number of composite layers 114 in FIG. 1.

Once stringer layup 1406 has been placed within channel 1404, bladder assembly 1300 may then be placed over stringer layup 1406 within channel 1404 of tool 1402 such that stringer layup 1406 substantially conforms to both shape 1408 of channel 1404 and shape 1410 of outer surface 210 of bladder 200.

Thereafter, composite panel 1412 may be placed over side 1306 of bladder 200. Composite panel 1412 may have substantially the same length as bladder assembly 1300. However, composite panel 1412 may be an example of one implementation for composite panel 113 in FIG. 1. As depicted, both composite panel 1412 and bladder assembly 1300 may be longer than stringer layup 1406.

Tool setup 1400 may include other components (not shown) for use in curing composite panel 1412 with stringer layup 1406. These other components may include, for example, without limitation, a vacuum bag (not shown). Composite panel 1412 with stringer layup 1406 may be cured together to form a composite stringer integrated with composite panel 1412. Composite insert 1301 may ensure that side 205 of end portion of bladder 200 in contact with composite panel 1412 is reinforced during curing.

Figure 15:
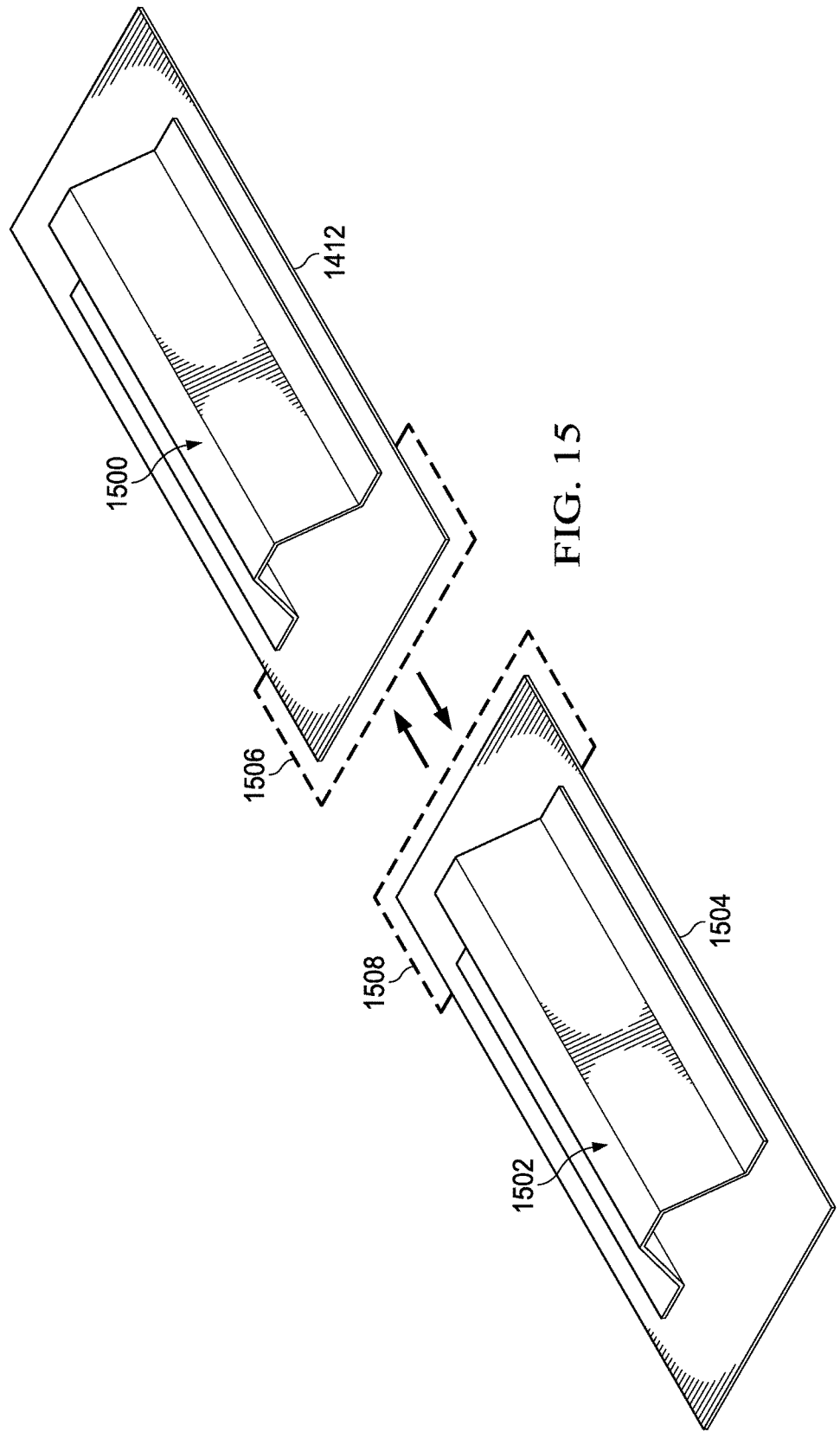
FIG. 15 an illustration of two composite stringers integrated with composite panels is depicted in accordance with an illustrative embodiment.

With reference now to FIG. 15, an illustration of two composite stringers integrated with composite panels is depicted in accordance with an illustrative embodiment. In this illustrative example, composite stringer 1500 may be formed by curing stringer layup 1406 from FIG. 14 with composite panel 1412 from FIG. 14. Composite stringer 1502 may be formed by curing another stringer layup with composite panel 1504.

Both composite stringer 1500 and composite stringer 1502 may be formed using bladder assembly 1300 from FIG. 13 that includes composite insert 1301. Using composite insert 1301 in FIG. 13 may ensure that end portion 1506 of composite panel 1412 and end portion 1508 of composite panel 1504 remain substantially planar within selected tolerances. In this illustrative example, end portion 1506 and end portion 1508 may be joined together to form, for example, without limitation, a splice joint.

In other words, composite stringer 1500 may be associated with composite stringer 1502 by splicing end portion 1506 of composite panel 1412 and end portion 1508 of composite panel 1504 together. Thus, composite panel 1412 and composite panel 1504 may be joined by a splice joint.

The illustrations of bladder 200 in FIGS. 2-3, 7-9, and 11-13, composite insert 600 and composite insert 601 in FIGS. 6-12, structural element 1000 in FIGS. 10-12, composite insert 1301 in FIGS. 13-14, tool setup 1400 in FIG. 14, and composite stringer 1500 and composite stringer 1502 in FIG. 15 are not meant to imply physical or architectural limitations to the manner in which an illustrative embodiment may be implemented. Other components in addition to or in place of the ones illustrated may be used. Some components may be optional.

The different components shown in FIGS. 2-15 may be illustrative examples of how components shown in block form in FIG. 1 can be implemented as physical structures. Additionally, some of the components in FIGS. 2-15 may be combined with components in FIG. 1, used with components in FIG. 1, or a combination of the two.

Figure 16:
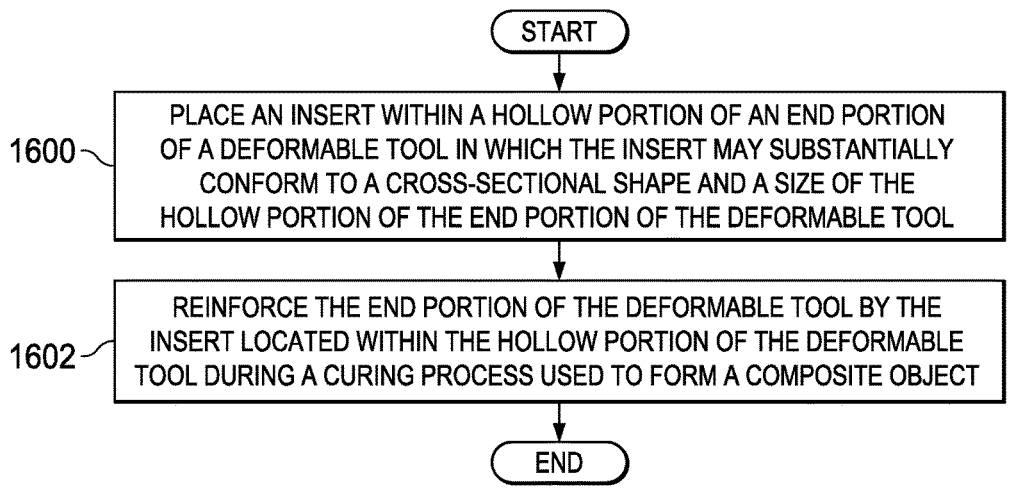
FIG. 16 is an illustration of a process for reinforcing a tool configured for use in forming a composite object in the form of a flowchart in accordance with an illustrative embodiment.

With reference now to FIG. 16, an illustration of a process for reinforcing a tool configured for use in forming a composite object is depicted in the form of a flowchart in accordance with an illustrative embodiment. The process illustrated in FIG. 16 may be used to reinforce deformable tool 102 in FIG. 1.

The process may begin by placing insert 124 within hollow portion 112 of end portion 121 of deformable tool 102 in which insert 124 may substantially conform to cross-sectional shape 120 and size 118 of hollow portion 112 of end portion 121 of deformable tool 102 (operation 1600). End portion 121 of deformable tool 102 may then be reinforced by insert 124 located within hollow portion 112 of deformable tool 102 during curing process 115 used to form composite object 104 (operation 1602), with the process terminating thereafter.

Figure 17:
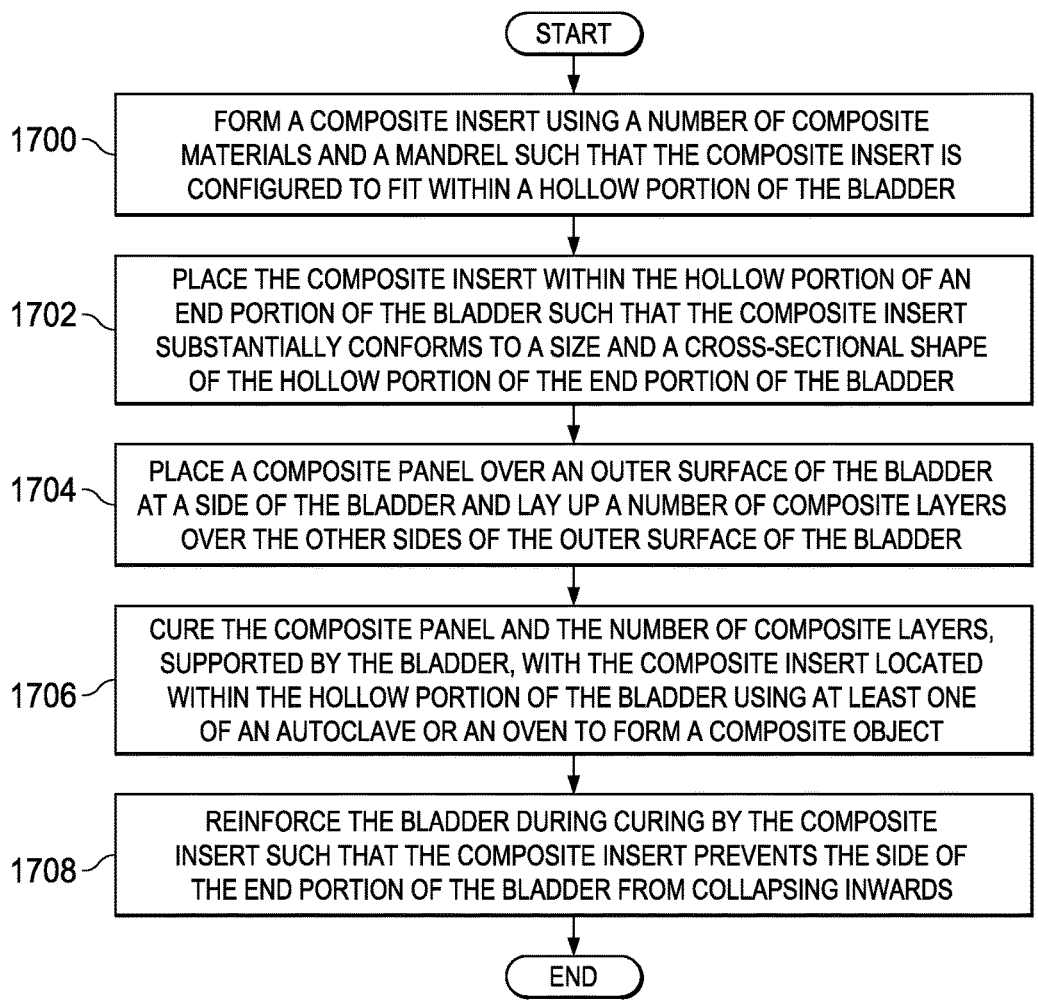
FIG. 17 is an illustration of a process for reinforcing a bladder in the form of a flowchart in accordance with an illustrative embodiment.

With reference now to FIG. 17, an illustration of a process for reinforcing a bladder is depicted in the form of a flowchart in accordance with an illustrative embodiment. The process illustrated in FIG. 14 may be used to reinforce bladder 106 in FIG. 1.

The process may begin by forming composite insert 126 using number of composite materials 128 and mandrel 138 such that composite insert 126 is configured to fit within hollow portion 112 of bladder 106 (operation 1700). Composite insert 126 may be placed within hollow portion 112 of end portion 121 of bladder 106 such that composite insert 126 substantially conforms to size 118 and cross-sectional shape 120 of hollow portion 112 of end portion 121 of bladder 106 (operation 1702).

Next, composite panel 113 may be placed over outer surface 108 of bladder 106 at side 116 of bladder 106 and number of composite layers 114 may be laid up over the other sides of outer surface 108 of bladder 106 (operation 1704). Thereafter, composite panel 113 and number of composite layers 114, supported by bladder 106, may be cured with composite insert 126 located within hollow portion 112 of bladder 106 using at least one of an autoclave or an oven to form composite object 104 (operation 1706). Bladder 106 may be reinforced during curing by composite insert 126 such that composite insert 126 prevents side 116 of end portion 121 of bladder 106 from depressing inwards (operation 1708), with the process terminating thereafter.

Illustrative embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in the form of a flowchart in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18. In particular, insert 124 from FIG. 1 may be used to reinforce bladder 106 when bladder 106 is used to form composite object 104 during any one of the stages of aircraft manufacturing and service method 1800. For example, without limitation, insert 124 from FIG. 1 may be used during at least one of component and subassembly manufacturing 1806, system integration 1808, routine maintenance and service 1814, or some other stage of aircraft manufacturing and service method 1800. Further, insert 124 may be used to reinforce bladder 106 when bladder 106 is used to form multiple stringers for airframe 1902 of aircraft 1900.

In one illustrative example, components or subassemblies produced in component and subassembly manufacturing 1806 in FIG. 18 may be fabricated or manufactured in a manner similar to components or subassemblies produced while aircraft 1900 is in service 1812 in FIG. 18. As yet another example, one or more apparatus embodiments, method embodiments, or a combination thereof may be utilized during production stages, such as component and subassembly manufacturing 1806 and system integration 1808 in FIG. 18. One or more apparatus embodiments, method embodiments, or a combination thereof may be utilized while aircraft 1900 is in service 1812 and/or during maintenance and service 1814 in FIG. 18. The use of a number of the different illustrative embodiments may substantially expedite the assembly of and/or reduce the cost of aircraft 1900.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative examples described in the figures above provide a method and apparatus for reinforcing a bladder, such as bladder 106 in FIG. 1, which may be used for forming composite objects, such as composite object 104 in FIG. 1. In particular, bladder 106 may be reinforced using an insert, such as composite insert 126 in FIG. 1. Composite insert 126 may be placed within hollow portion 112 of end portion 121 of bladder 106 such that composite insert 126 substantially conforms to cross-sectional shape 120 and size 118 of hollow portion 112 of end portion 121 of bladder 106. Composite insert 126 may reinforce side 116 of end portion 121 of bladder 106 during curing process 115 when bladder 106 is being used to form composite object 104.

In this manner, by using composite insert 126, bladder 106 from FIG. 1 may be repeatedly used to form multiple composite objects without the risk of side 116 of end portion 121 of bladder 106 depressing inwards. Thus, composite insert 126 may increase the life expectancy and usability of bladder 106.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a deformable tool configured for use in forming a composite object by a curing process in which the deformable tool has a hollow portion; and
a composite insert configured for placement within the hollow portion of an end portion of the deformable tool to reinforce a side of the end portion of the deformable tool during the curing process in which the composite insert substantially conforms to a cross-sectional shape and a size of the hollow portion of the deformable tool, wherein the composite insert comprises an outer surface of the composite insert configured to contact an inner surface of the deformable tool, an inner surface of the composite insert that is substantially parallel with the outer surface of the composite insert along an entire length of the composite insert such that the inner surface of the composite insert has a shape substantially congruent with a shape of the outer surface of the composite insert, and at least one structural member extending within a hollow portion of the composite insert between a first side of the inner surface of the composite insert and a second side of the inner surface of the composite insert, wherein the inner surface of the composite insert defines the hollow portion within the composite insert, wherein the composite insert has a uniform cross section along the entire length of the composite insert.

2. The apparatus of claim 1, wherein the composite insert is configured to reinforce the side of the end portion of the deformable tool by preventing the side of the end portion of the deformable tool from collapsing inwards during the curing process.

3. The apparatus of claim 1, wherein the deformable tool is a bladder.

4. The apparatus of claim 3, wherein the bladder comprises:
an outer surface of the deformable tool, wherein a composite panel and a number of composite layers are configured to be laid up over the outer surface of the deformable tool to form the composite object; and
the inner surface of the deformable tool, wherein the inner surface defines the cross-sectional shape and the size of the hollow portion of the deformable tool.

5. The apparatus of claim 1, wherein the composite insert comprised of a number of composite materials.

6. The apparatus of claim 1, wherein the composite insert is comprised of a number of materials selected such that the composite insert has a desired thermal expansion coefficient.

7. The apparatus of claim 1, wherein the composite insert is configured to reinforce the side of the end portion of the deformable tool such that an end portion of a composite panel positioned over the side of the end portion of the deformable tool remains substantially planar within selected tolerances after the curing process.

8. The apparatus of claim 7, wherein the composite insert reinforces the side of the end portion of the deformable tool such that the end portion of the composite panel meets the selected tolerances for forming a splice joint after the curing process.

9. The apparatus of claim 1, wherein an entire length of the composite insert is configured to contact only a portion of a circumference of the inner surface of the deformable tool within the hollow portion of the deformable tool.

10. A bladder assembly comprising:
a bladder comprising:
an outer surface in which a composite panel and a number of composite layers are configured to be laid up over the outer surface of the bladder; and
an inner surface in which the inner surface forms a hollow portion of the bladder; and
a composite insert placed within the hollow portion of an end portion of the bladder to reinforce a side of the end portion of the bladder in contact with an end portion of the composite panel when the composite insert and the bladder with the composite panel and the number of composite layers around the outer surface of the bladder are cured in a curing process to form a composite object in which the composite insert substantially conforms to a cross-sectional shape and a size of the hollow portion of the end portion of the bladder, wherein the composite insert comprises an outer surface of the composite insert configured to contact an inner surface of the bladder, an inner surface of the composite insert that is substantially parallel with the outer surface of the composite insert along an entire length of the composite insert such that the inner surface of the composite insert has a shape substantially congruent with a shape of the outer surface of the composite insert, and at least one structural member extending within a hollow portion of the composite insert between a first side of the inner surface of the composite insert and a second side of the inner surface of the composite insert, wherein the inner surface of the composite insert defines the hollow portion within the composite insert, wherein the composite insert has a uniform cross section along an entire length of the composite insert.

11. The bladder assembly of claim 10, wherein an entire length of the composite insert is configured to contact only a portion of a circumference of the inner surface of the bladder within the hollow portion of the bladder.

12. A method for reinforcing an end portion of a deformable tool configured for use in forming a composite object, the method comprising:
placing a composite insert within a hollow portion of the end portion of the deformable tool in which the composite insert substantially conforms to a cross-sectional shape and a size of the hollow portion of the end portion of the deformable tool, wherein the composite insert comprises an outer surface of the composite insert configured to contact an inner surface of the deformable tool, an inner surface of the composite insert that is substantially parallel with the outer surface of the composite insert along an entire length of the composite insert such that the inner surface of the composite insert has a shape substantially congruent with a shape of the outer surface of the composite insert, and at least one structural member extending within a hollow portion of the composite insert between a first side of the inner surface of the composite insert and a second side of the inner surface of the composite insert, wherein the inner surface of the composite insert defines the hollow portion within the composite insert, wherein the composite insert has a uniform cross section along an entire length of the composite insert; and reinforcing a side of the end portion of the deformable tool by the insert located within the hollow portion of the end portion of the deformable tool during a curing process used to form the composite object.

13. The method of claim 12 further comprising:

laying up a composite panel and a number of composite layers over an outer surface of the deformable tool, wherein the deformable tool is a bladder.

14. The method of claim 13 further comprising:

curing the composite panel and the number of composite layers laid up over the outer surface of the bladder with the composite insert located within the hollow portion of the end portion of the bladder.

15. The method of claim 14, wherein reinforcing the deformable tool comprises:

reinforcing the side of the end portion of the bladder with the composite insert located within the hollow portion of the end portion of the bladder during the curing process to prevent the side of the end portion of the bladder from collapsing inwards during the curing process.

16. The method of claim 14, wherein curing the number of composite layers comprises:

curing the composite panel and the number of composite layers laid up over the outer surface of the bladder with the composite insert located within the hollow portion of the end portion of the bladder using at least one of an autoclave or an oven.

17. The method of claim 12, wherein placing the composite insert within the hollow portion of the deformable tool comprises:

placing the composite insert within the hollow portion of the deformable tool, wherein the composite insert is configured to contact a portion of an inner surface of a bladder.

18. The method of claim 12 further comprising:

forming the composite insert using a number of composite materials.

19. The method of claim 18, wherein forming the composite insert using the number of composite materials comprises:

laying up a composite fabric over a mandrel; and
curing the composite fabric laid up over the mandrel to form the composite insert, wherein the composite insert is a composite sleeve.

20. A method for reinforcing a bladder, the method comprising:

forming a composite insert using a number of composite materials and a mandrel such that the composite insert is configured to fit within a hollow portion of an end portion of the bladder;

placing the composite insert within the hollow portion of the end portion of the bladder such that the composite insert substantially conforms to a size and a cross-sectional shape of the hollow portion of the end portion of the bladder, wherein the composite insert comprises an outer surface of the composite insert configured to contact an inner surface of the bladder, an inner surface of the composite insert that is substantially parallel with the outer surface of the composite insert along an entire length of the composite insert such that the inner surface of the composite insert has a shape substantially congruent with a shape of the outer surface of the composite insert, and at least one structural member extending within a hollow portion of the composite insert between a first side of the inner surface of the composite insert and a second side of the inner surface of the composite insert, wherein the inner surface of the composite insert defines the hollow portion within the composite insert, wherein the composite insert has a uniform cross section along an entire length of the composite insert;

laying up a composite panel and a number of composite layers over an outer surface of the bladder;

performing a curing process to cure the composite panel and the number of composite layers laid up over the outer surface of the bladder with the composite insert located within the hollow portion of the end portion of the bladder using at least one of an autoclave or an oven to form a composite object; and reinforcing a side of the end portion of the bladder in contact with an end portion of the composite panel during the curing process by the composite insert in which the composite insert prevents the side of the end portion of the bladder from collapsing inwards during the curing process.

21. The method of claim 12, wherein an entire length of the composite insert is configured to contact only a portion of a circumference of the inner surface of the deformable tool within the hollow portion of the deformable tool.

22. The method of claim 20, wherein an entire length of the composite insert is configured to contact only a portion of a circumference of the inner surface of the bladder within the hollow portion of the bladder.

* * * * *

UNITED STATES PATENT AND TRADEMARK OFFICE
CERTIFICATE OF CORRECTION

| | |
|---|---|
| PATENT NO. | : 9,623,641 B1 |
| APPLICATION NO. | : 14/035007 |
| DATED | : April 18, 2017 |
| INVENTOR(S) | : Michael R. Chapman and Khanh M. Pham |

Page 1 of 1

It is certified that error appears in the above-identified patent and that said Letters Patent is hereby corrected as shown below:

In the Claims

Column 13, Line 57, insert --is-- after "insert"

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*